United States Patent [19]

Auman et al.

[11] 3,925,753
[45] Dec. 9, 1975

[54] SPEED COMPENSATED FUEL CONSUMPTION WARNING DEVICE

[75] Inventors: John T. Auman, Washington; Wesley A. Rogers, Grosse Pointe Park; Trevor O. Jones, Birmingham, all of Mich.

[73] Assignee: General Motors Corporation, Detroit, Mich.

[22] Filed: Feb. 10, 1975

[21] Appl. No.: 548,682

[52] U.S. Cl. .............................. 340/52 R; 340/62
[51] Int. Cl.² ........................................ B60Q 1/00
[58] Field of Search............ 340/52 R, 52 D, 53, 62, 340/262, 263; 180/103, 105 R, 105 E, 106

[56] References Cited
UNITED STATES PATENTS

| | | | |
|---|---|---|---|
| 3,647,016 | 3/1972 | Fitzsimons | 340/262 X |
| 3,794,972 | 2/1974 | Van Ostrom | 340/262 X |
| 3,863,211 | 1/1975 | Latham, Jr. | 340/62 X |

*Primary Examiner*—Alvin H. Waring
*Attorney, Agent, or Firm*—Howard N. Conkey

[57] ABSTRACT

A warning system for providing an indication when the fuel consumption of a throttle controlled vehicle having an internal combustion engine with an intake manifold exceeds pre-established levels. A vacuum transducer generates a signal having a magnitude representing the instantaneous intake manifold vacuum level. A vehicle speed transducer generates a speed signal having a magnitude varying with vehicle speed which, in combination with a reference signal, establishes a manifold vacuum trigger level which represents, at each instantaneous vehicle speed, fuel consumption in excess of a pre-established level for that speed. A comparator compares the manifold vacuum trigger level with the vacuum signal and energizes an indicator when the vacuum signal represents an intake manifold vacuum level below the manifold vacuum trigger level so as to provide an indication of fuel consumption in excess of the pre-established level for the instantaneous vehicle speed.

2 Claims, 1 Drawing Figure

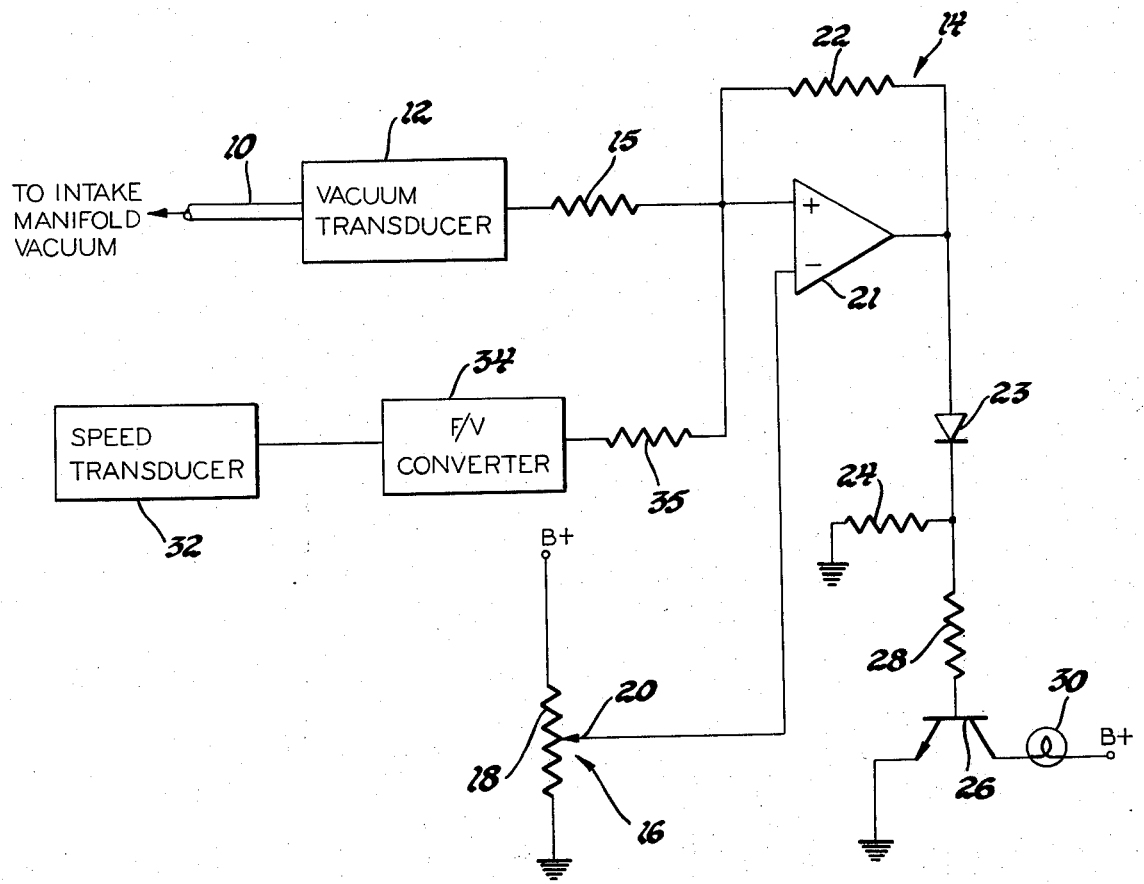

SPEED COMPENSATED FUEL CONSUMPTION WARNING DEVICE

This invention relates to a fuel consumption warning device and more particularly to a warning system for a vehicle having a throttle controlled internal combustion engine with an intake manifold which provides a warning when the intake manifold pressure decreases to a pre-established level which is varied as a function of vehicle speed.

Systems for providing a warning to a vehicle operator when the vehicle intake manifold pressure decreases to a pre-established level in order to provide an indication of uneconomical operation of the vehicle are generally known. In all of these known systems, an intake manifold vacuum level at which a warning is provided is selected which is applicable at all vehicle operating speeds. Although the selected level may be truly indicative of excessive fuel consumption at one operational speed, it may not be indicative of excessive fuel consumption at all other speeds.

In view of the foregoing, it is the general object of this invention to provide an improved speed compensated fuel consumption warning device for use with a vehicle powered by a throttle controlled internal combustion engine having an intake manifold.

It is another object of this invention to provide a fuel consumption warning device for a vehicle powered by an internal combustion engine having an intake manifold which provides a warning when the vehicle intake manifold pressure decreases below a level which is varied as a function of vehicle speed.

These and other objects of this invention may be best understood by reference to the following description of a preferred embodiment and the drawing which is a schematic diagram illustrating the preferred embodiment of the invention.

Referring to the drawing, there is illustrated a warning device for providing an indication of excessive fuel consumption by a vehicle powered by a throttle controlled internal combustion engine having an intake manifold. A conduit 10 pneumatically couples the intake manifold vacuum to a vacuum transducer 12. The vacuum transducer 12 is effective to generate a voltage having a magnitude which progressively changes with a progressively increased intake manifold vacuum level. In the preferred embodiment, the magnitude of the voltage generated by the vacuum transducer 12 progressively decreases with an increasing intake manifold vacuum level. The voltage generated by the vacuum transducer 12 is coupled to the positive input of a summing switch 14 through a resistor 15. The resulting current supplied by the vacuum transducer 12, hereinafter referred to as the vacuum signal, progressively decreases with increasing intake manifold vacuum level.

A potentiometer 16 includes a resistive element 18 coupled between a positive voltage source B+ and ground potential and a wiper arm 20. The positive voltage source B+ may take the form of the positive terminal of the vehicle battery whose negative terminal is grounded. The wiper arm 20 is coupled to the negative input of the summing switch 14. The potentiometer 16 functions to supply a current, hereinafter referred to as the reference signal, having a magnitude substantially equal to the magnitude of the vacuum signal at a specified intake manifold vacuum level which has been determined to represent excessive fuel consumption when the vehicle speed is zero. The summing switch 14 takes the form of a high gain differential amplifier 21 with a feedback resistor 22 as illustrated in the drawing.

The output of the summing switch 14 is coupled to the anode of a diode 23 whose cathode is coupled to ground through a resistor 24 and to the base electrode of an NPN transistor 26 through a resistor 28. The emitter electrode of the transistor 26 is coupled to ground and the collector electrode thereof is coupled to the positive voltage source B+ through a lamp 30. The lamp 30 may be located at the vehicle instrument panel or any other location where it is readily observable by the vehicle operator. Alternatively, the lamp 30 may be replaced with a buzzer to provide an audible indication.

When the output of the summing switch 14 is a positive voltage, the transistor 26 is biased conductive to energize the lamp 30 and conversely, when the output is negative, the transistor 26 is biased nonconductive and the lamp 30 is extinguished.

With only the elements described above, the lamp 30 would be energized to provide a warning whenever the manifold vacuum level decreased below a level represented by the reference signal supplied by the potentiometer 16. Although this level may truly be indicative of excessive fuel consumption at one specific vehicle speed it may not be indicative of excessive fuel consumption at other vehicle speeds. For example, the manifold vacuum level representing excessive fuel consumption increases from the level represented by the reference signal supplied by the potentiometer 16 when set as indicated above as vehicle speed increases. By vehicle testing, the magnitude of this increase for each vehicle speed may be determined.

To provide a manifold vacuum trigger level which increases with increasing vehicle speed, a speed transducer 32 is provided which generates a series of voltage pulses having a frequency progressively increasing with increasing vehicle speed. The speed transducer 32 may take the form of a slotted disc rotated by a vehicle wheel adjacent a magnetic pickup whose output is a series of voltage pulses having the frequency related to vehicle speed. These voltage pulses are supplied to a frequency-to-voltage converter 34 whose output is a voltage having a magnitude progressively increasing with increasing vehicle speed. The output of the frequency-to-voltage converter 34 is coupled to the positive input of the summing switch 14 through a resistor 35. The resulting current supplied by the frequency-to-voltage converter 34, hereinafter referred to as the speed signal, has a magnitude progressively increasing with increasing vehicle speed.

By conventional circuit design techniques, the magnitude of the speed signal may be made to equal the difference between the magnitude of the reference signal and the magnitude of the vacuum signal when the manifold vacuum is at the level determined to represent excessive fuel consumption at the instantaneous speed represented by the output of the speed transducer 32.

By combining the speed signal in proper sense with the reference signal, the manifold vacuum level at which the output of the summing switch 14 swings positive to effect energization of the lamp 30, hereinafter referred to as the manifold vacuum trigger level, may be increased as a function of vehicle speed. This is accomplished by the coupling of the speed signal from the frequency-to-voltage converter 34 to the positive input of the summing switch 14 so as to be summed in subtractive fashion from the reference signal supplied by the potentiometer 16.

In operation, when the vehicle speed is zero, the output of the frequency-to-voltage converter 34 is also zero and the summing switch 14 generates a positive voltage to bias the transistor into conduction and energize the lamp 30 when the vehicle is operated in a manner such that the intake manifold vacuum level decreases below the vacuum level represented by the magnitude of the reference signal supplied by the potentiometer 16. This signal provides an indication of fuel consumption in excess of the predetermined amount at zero vehicle speed.

At increased vehicle speeds, the frequency-to-voltage converter 34 generates the speed signal which is coupled to the positive input of the summing switch 14. Consequently, the required vacuum signal output of the vacuum transducer 12 to cause the summing switch 14 to generate a positive signal output decreases correspondingly to the desired increase in the manifold vacuum trigger level. When the vehicle is operated in a manner such that the manifold vacuum decreases below the manifold vacuum trigger level established at the instantaneous vehicle speed, the output of the summing switch 14 swings positive to effect energization of the lamp 30 to provide an indication of fuel consumption in excess of the predetermined amount at that speed.

The potentiometer 16 may be positioned in the vehicle compartment so as to allow the vehicle operator to adjust the wiper arm 20 and shift the vacuum trigger level for all vehicle speeds and thereby selectively establish desired fuel consumption warning levels. For example, if the vehicle is under a heavy load, the vacuum level at each vehicle speed which is indicative of excessive fuel consumption may be less than when the vehicle is under normal load. The vehicle operator may compensate for the heavy load condition by adjustment of the wiper arm 20 to vary the magnitude of the reference signal and provide for lower manifold vacuum trigger levels at all vehicle speeds.

In the preferred embodiment illustrated in the drawing, the summing switch 14 summed the output of the frequency-to-voltage converter 34 and the potentiometer 16 in subtractive fashion since the output of the vacuum transducer 12 progressively decreased with progressively increasing manifold vacuum. As can be seen, if the signals generated by the various transducers varied in a different manner, they must be combined in the proper sense to achieve the desired manifold vacuum trigger level change in response to vehicle speed changes. For example, if the vacuum transducer 12 supplied a signal which had a magnitude progressively increasing with increasing intake manifold vacuum level, the output of the frequency-to-voltage converter 34 would then be summed in additive fashion with the reference signal at the positive input of the summing switch 14 and the vacuum signal would be coupled to the negative input thereof.

What has been described is a fuel consumption warning device for use with a vehicle having an internal combustion engine with an intake manifold, wherein a warning of excessive fuel consumption is provided when the intake manifold vacuum level decreases below a manifold vacuum trigger level which is varied as a function of vehicle speed.

The detailed description of the preferred embodiment of this invention for the purpose of explaining the principles thereof is not to be considered as limiting or restricting the invention since many modifications may be made by the exercise of skill in the art without departing from the scope of the invention.

We claim:

1. A fuel consumption warning device for use with a vehicle powered by a throttle controlled internal combustion engine having an intake manifold, comprising: a vacuum transducer pneumatically coupled with the intake manifold for generating a vacuum signal having a magnitude progressively changing with a progressively increased manifold vacuum level; means for generating a speed signal having a magnitude substantially equal to the difference between the magnitude of the vacuum signal at a manifold vacuum level representing a predetermined excessive fuel consumption at zero vehicle speed and the magnitude of the vacuum signal at a manifold vacuum level representing a predetermined excessive fuel consumption at the instantaneous vehicle speed; means combining said speed signal and vacuum signal and generating an output signal when the magnitude of the combined signals differs with a fixed polarity from the magnitude of the vacuum signal at the manifold vacuum level representing the predetermined excessive fuel consumption at zero vehicle speed; and an indicator responsive to the output signal for producing an operator observable indication representing excessive fuel consumption at the instantaneous vehicle speed.

2. A fuel consumption warning device for use with a vehicle powered by a throttle controlled internal combustion engine having an intake manifold, comprising: a vacuum transducer pneumatically coupled with the intake manifold for generating a vacuum signal having a magnitude progressively changing with a progressively increased intake manifold vacuum level; means for generating a reference signal having a magnitude substantially equal to the magnitude of the vacuum signal at an intake manifold vacuum representing a predetermined excessive fuel consumption at zero vehicle speed; a vehicle speed transducer for generating a speed signal having a magnitude progressively changing with a progressively increased vehicle speed, whereby throughout a predetermined speed range, the magnitude of the sum of the speed signal and the reference signal is equal to the magnitude of the vacuum signal at an intake manifold vacuum representing a predetermined excessive fuel consumption at the instantaneous vehicle speed; means for combining the vacuum signal, the speed signal, and the reference signal and generating an output signal when the magnitude of the sum of the reference signal and the speed signal represents a manifold vacuum level exceeding the manifold vacuum level represented by the vacuum signal; and an indicator responsive to the output signal for producing an operator observable indication representing excessive fuel consumption at the instantaneous vehicle speed.

* * * * *